US010673290B2

(12) United States Patent
Gilmore et al.

(10) Patent No.: US 10,673,290 B2
(45) Date of Patent: Jun. 2, 2020

(54) BRUSHLESS DC ELECTRIC MOTOR

(71) Applicant: American Axle & Manufacturing, Inc., Detroit, MI (US)

(72) Inventors: Curt D. Gilmore, Fenton, MI (US); Daryl Beesley, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 1059 days.

(21) Appl. No.: 15/051,838

(22) Filed: Feb. 24, 2016

(65) Prior Publication Data

US 2016/0254735 A1 Sep. 1, 2016

Related U.S. Application Data

(60) Provisional application No. 62/173,624, filed on Jun. 10, 2015, provisional application No. 62/120,956, filed on Feb. 26, 2015.

(51) Int. Cl.
| | |
|---|---|
| *H02K 1/27* | (2006.01) |
| *H02K 15/03* | (2006.01) |
| *H02K 1/28* | (2006.01) |
| *H02K 15/10* | (2006.01) |
| *H02K 21/12* | (2006.01) |
| *H02K 15/16* | (2006.01) |
| *H02K 7/00* | (2006.01) |
| *H02K 7/08* | (2006.01) |

(52) U.S. Cl.
CPC ............ *H02K 1/2733* (2013.01); *H02K 1/28* (2013.01); *H02K 15/03* (2013.01); *H02K 15/10* (2013.01); *H02K 21/12* (2013.01); *H02K 7/003* (2013.01); *H02K 7/085* (2013.01); *H02K 15/165* (2013.01)

(58) Field of Classification Search
CPC .......... H02K 1/2733; H02K 1/28; H02K 1/30; H02K 15/03
See application file for complete search history.

(56) References Cited

U.S. PATENT DOCUMENTS

| | | | | |
|---|---|---|---|---|
| 4,414,523 A | * | 11/1983 | Pieters ................. | H01F 7/0221 335/302 |
| 5,157,292 A | | 10/1992 | Morrill | |
| 6,437,471 B1 | | 8/2002 | Ogawara et al. | |
| 7,067,944 B2 | | 6/2006 | Lieu et al. | |
| 7,067,952 B2 | | 6/2006 | Neal | |
| 7,154,200 B2 | | 12/2006 | Neal | |

(Continued)

FOREIGN PATENT DOCUMENTS

| | | |
|---|---|---|
| CN | 1379417 A | 11/2002 |
| CN | 201160240 Y | 12/2008 |

(Continued)

OTHER PUBLICATIONS

Office Action dated Jan. 9, 2019 for CN application No. 201680019317.7 filed Sep. 28, 2017.

(Continued)

*Primary Examiner* — Livius R. Cazan
(74) *Attorney, Agent, or Firm* — Burris Law, PLLC

(57) ABSTRACT

A brushless DC electric motor having a rotor with a single bearing, a multi-pole oriented magnet, an output coupling and a rotor shell. The rotor shell is formed of an electrically insulating material and can be overmolded onto the magnet, the bearing and the output coupling.

38 Claims, 8 Drawing Sheets

(56) References Cited

U.S. PATENT DOCUMENTS

| | | |
|---|---|---|
| 7,683,509 B2 | 3/2010 | Neal |
| 7,928,348 B2 | 4/2011 | Neal |
| 8,167,589 B2 | 5/2012 | Hidaka et al. |
| 8,593,027 B2 | 11/2013 | Marchitto et al. |
| 2001/0048261 A1* | 12/2001 | Kojima .................... H02K 1/30 310/156.13 |
| 2006/0255678 A1 | 11/2006 | Du et al. |
| 2011/0273037 A1* | 11/2011 | Ota ...................... H02K 1/2733 310/50 |
| 2012/0256500 A1 | 10/2012 | Mann et al. |

FOREIGN PATENT DOCUMENTS

| | | |
|---|---|---|
| EP | 2124316 A1 | 11/2009 |
| JP | 2000184637 A | 6/2000 |
| JP | 2001-178040 A | 6/2001 |
| JP | 2003017309 A | 1/2003 |
| JP | 2004-120891 A | 4/2004 |
| JP | 2007-267487 A | 10/2007 |
| JP | 2009-112158 A | 5/2009 |
| JP | 2009-184317 A | 8/2009 |
| JP | 2014-195351 A | 10/2014 |
| WO | WO-2008/149880 A1 | 12/2008 |

OTHER PUBLICATIONS

PCT International Searching Authority communication dated Jul. 25, 2016 for related PCT application No. PCT/US2016/019803, filed Feb. 26, 2016.

Japanese Office Action (English translation included) for Appl'n No. 2017-545333; dated Dec. 3, 2019; 17 pp.

* cited by examiner

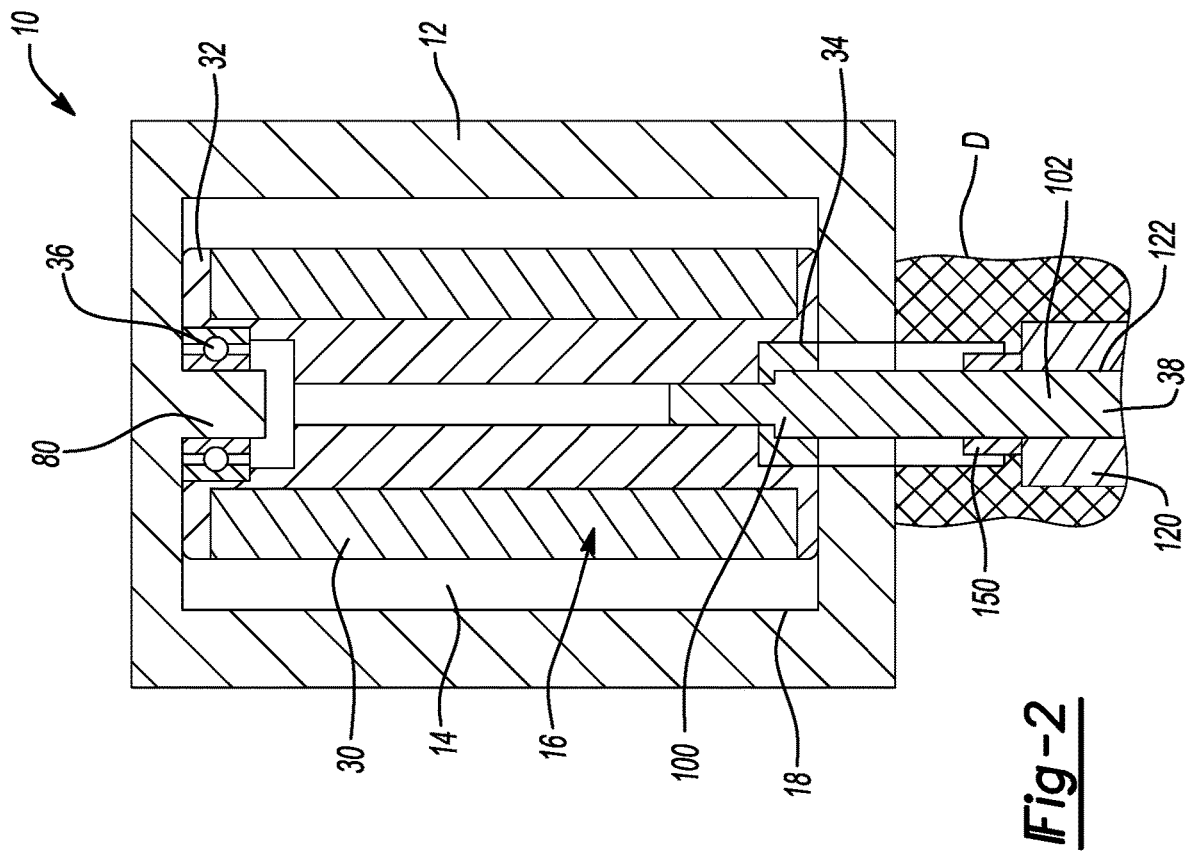
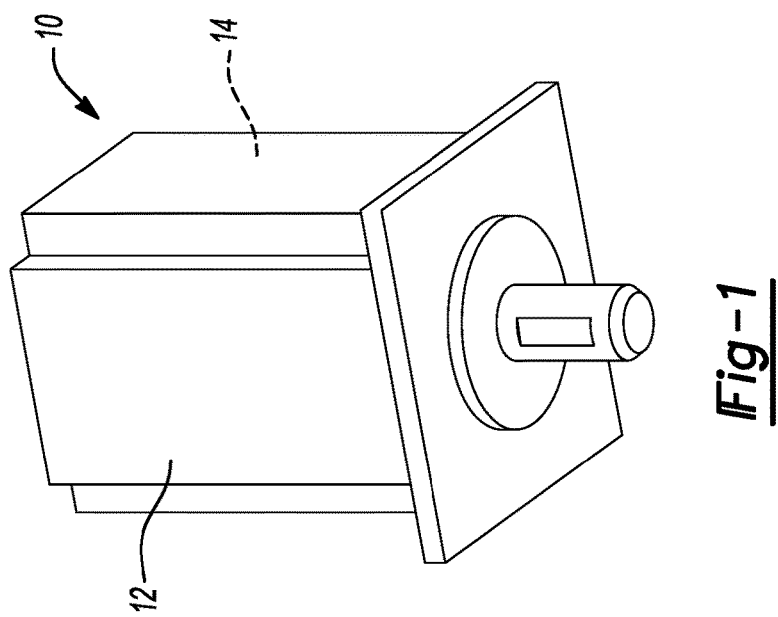

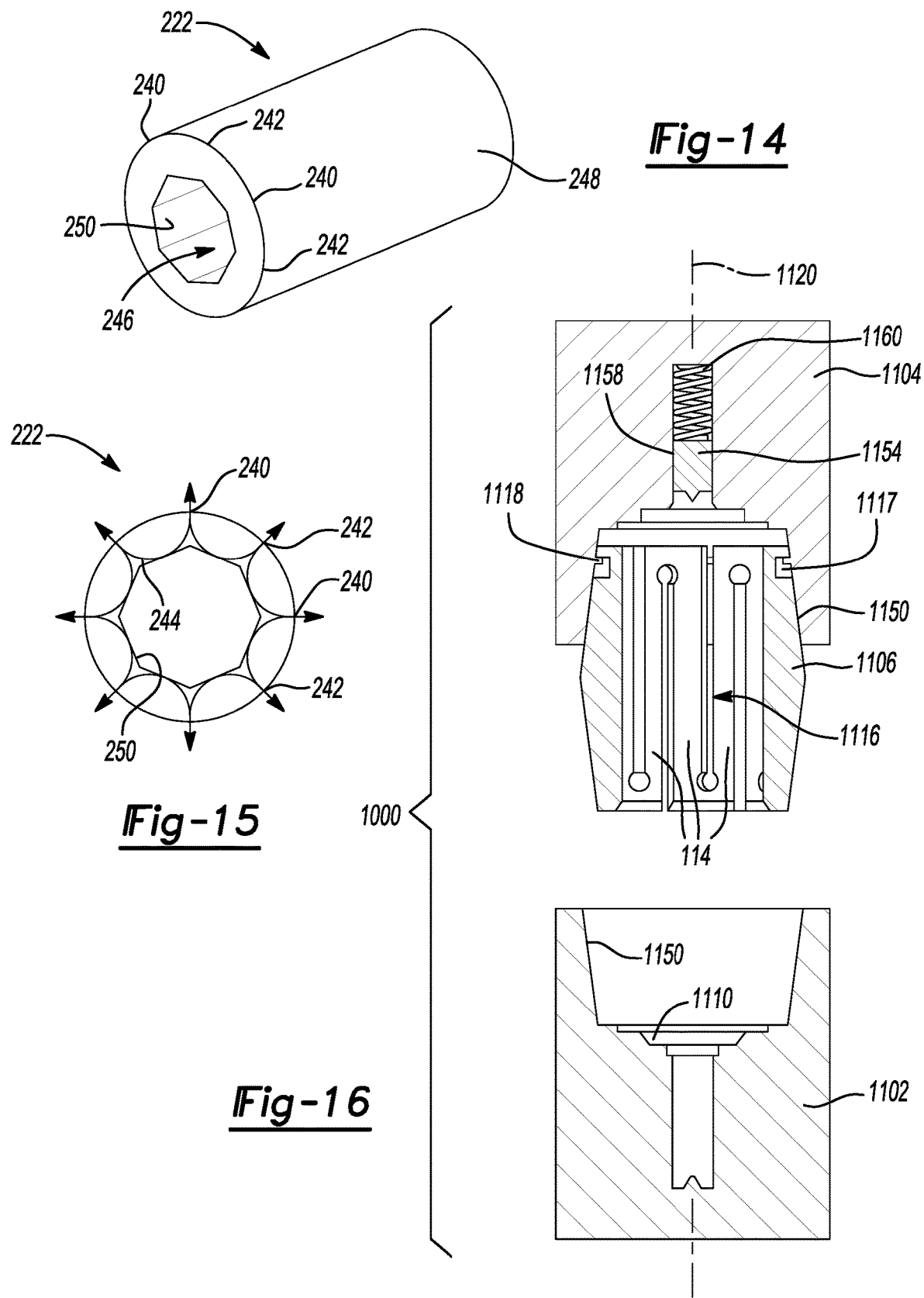

BRUSHLESS DC ELECTRIC MOTOR

CROSS-REFERENCE TO RELATED APPLICATIONS

This application claims the benefit of U.S. Provisional Patent Application No. 62/120,956 (filed Feb. 26, 2015) entitled "Brushless DC Electric Motor". This application also claims the benefit of U.S. Provisional Patent Application No. 62/173,624 (filed Jun. 10, 2015) entitled "Method For Forming The Rotor Of An Electric Motor". The disclosure of each of the above-referenced patent application is incorporated by reference as if fully set forth in detail herein.

FIELD

The present disclosure relates to a brushless DC electric motor.

BACKGROUND

This section provides background information related to the present disclosure which is not necessarily prior art.

Brushless DC electric motors are commonly employed in automotive vehicles for various pumps and actuators. I have noted that many of the brushless DC electric motors are relatively expensive and have designed a brushless DC electric motor having relatively less mass and fewer components as compared to a conventional brushless DC electric motor.

SUMMARY

This section provides a general summary of the disclosure, and is not a comprehensive disclosure of its full scope or all of its features.

In one form, the present teachings provide a method for forming a brushless DC electric motor. The method includes: providing a hollow magnet having a multi-pole configuration; overmolding a plastic material onto an interior surface of the hollow magnet; coupling an output member to the hollow magnet; and inserting a rotor into a stator, the rotor comprising the hollow magnet, the output member and the plastic material that is overmolded onto the interior surface of the hollow magnet.

In another form, the present teachings provide a brushless DC motor that includes a stator, which has with a plurality of windings, and a rotor that is received in the stator and is rotatable relative to the stator about a rotational axis. The rotor has an output member, a hollow magnet and a plastic material that is disposed between an interior surface of the hollow magnet and the output member. The hollow magnet has a multi-pole configuration. The plastic material is overmolded to the interior surface. An exterior surface of the hollow magnet is disposed concentrically about the rotational axis of the rotor. The interior surface is not centered about the rotational axis of the rotor so that a center of mass of the hollow magnet is radially offset from the rotational axis of the rotor.

In still another form, the present teachings provide a method for forming a rotor. The method includes: providing an injection mold having a collet and first and second mold members, the collet being received between the first and second mold members, each of the first and second mold members defining a portion of a mold cavity; installing a motor output member into one of the portions of the mold cavity; installing a hollow cylindrical magnet into the collet; positioning the first and second mold members in a closed position to locate an outer surface of the hollow cylindrical magnet relative to a rotational axis of the motor output member and to apply a compressive force onto the outer surface of the hollow cylindrical magnet; injecting molten plastic under pressure between hollow cylindrical magnet and the motor output member; and cooling the injected molten plastic to secure the motor output member to the hollow cylindrical magnet.

In yet another form, the present teachings provide a method for forming a rotor. The method includes: providing an injection mold having first and second mold members, each of the first and second mold members defining a portion of a mold cavity; installing a motor output member into one of the portions of the mold cavity; coupling a hollow cylindrical magnet to one of the first and second mold members; positioning the first and second mold members in a closed position to align a longitudinal axis of the motor output member coincidently with a rotational axis of a rotor that is defined by the first and second mold members, to locate the outer surface of the hollow cylindrical magnet concentrically about the rotor axis and to apply a compressive force to the outer surface of the hollow cylindrical magnet; injecting molten plastic under pressure between hollow cylindrical magnet and the motor output member; and cooling the injected molten plastic to secure the motor output member to the hollow cylindrical magnet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of an exemplary brushless DC electric motor constructed in accordance with the teachings of the present disclosure;

FIG. 2 is a longitudinal section view of the brushless DC electric motor of FIG. 1, shown in operative association with a driven device;

Figure 10:
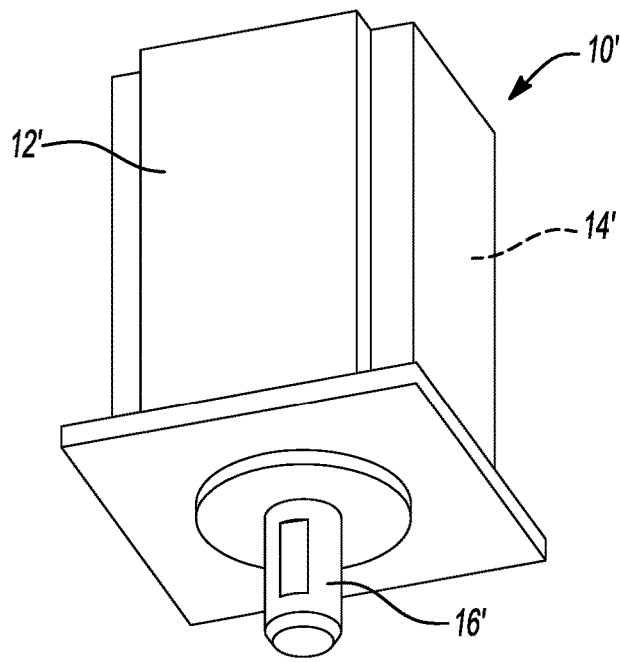
FIG. 10 is a perspective view of an exemplary brushless DC electric motor constructed in accordance with the teachings of the present disclosure.

FIG. 14 perspective view of a portion of the rotor, illustrating a hollow magnet in more detail;

FIG. 15 is a schematic view of an axial end of the magnet, illustrating a multi-pole orientation of the poles of the magnet;

FIG. 16 is a view of a portion of an exemplary injection mold that is configured for use in forming the rotor of the brushless DC electric motor of FIG. 10; and FIGS. 17 through 23 are views similar to that of FIG. 16 but depicting the injection mold at various stages of the process for forming the rotor.

Corresponding reference numerals indicate corresponding parts throughout the several views of the drawings.

DETAILED DESCRIPTION

With reference to FIGS. 1 and 2 of the drawings, an exemplary brushless DC electric motor constructed in accordance with the teachings of the present disclosure is generally indicated by reference numeral 10. The motor 10 can include a motor housing 12, a stator 14 and a rotor 16. The motor housing 12 can define a cavity 18 into which the stator 14 and the rotor 16 can be received. The stator 14 can be constructed in a conventional manner and need not be discussed in detail herein.

Figure 3:
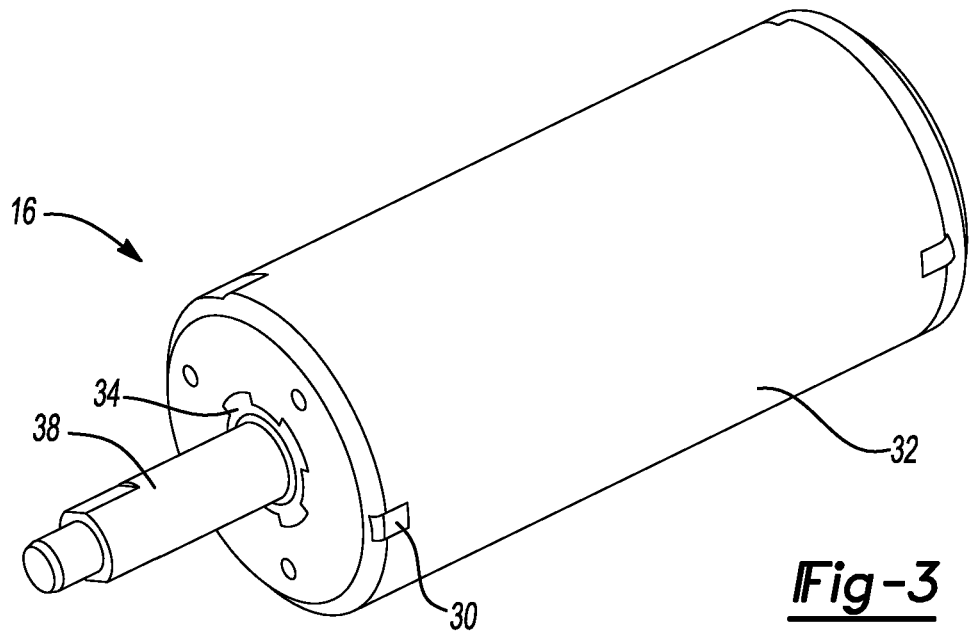
FIG. 3 is a perspective view of a portion of the brushless DC electric motor of FIG. 1, illustrating the rotor in more detail.
Figure 4:
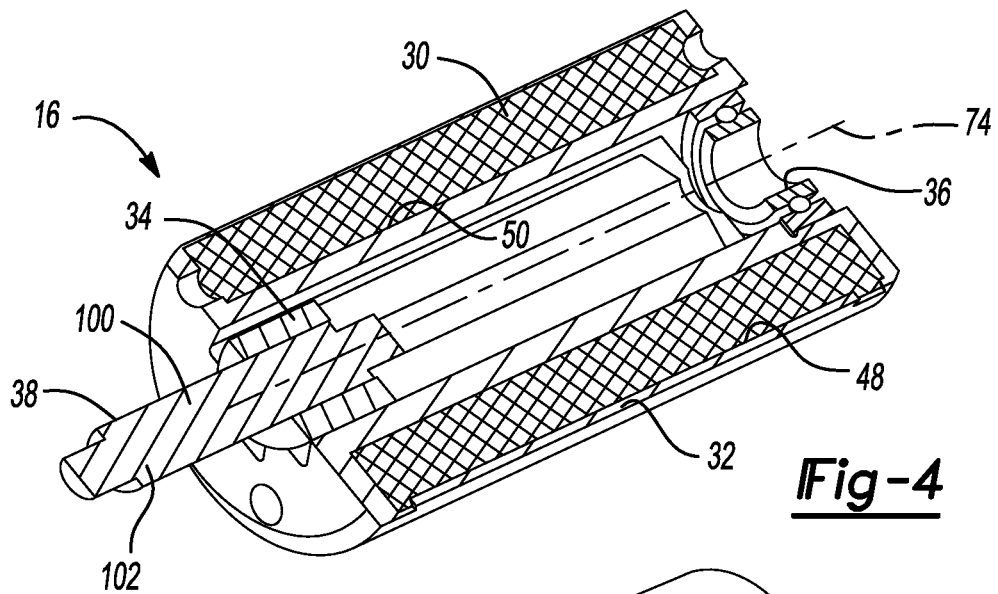
FIG. 4 is a longitudinal section view of the rotor of FIG. 3.

In FIGS. 2, 3 and 4, the rotor 16 can comprise a magnet 30, a rotor shell 32, an output coupling 34, a bearing 36 and an optional shaft member 38.

Figure 5:
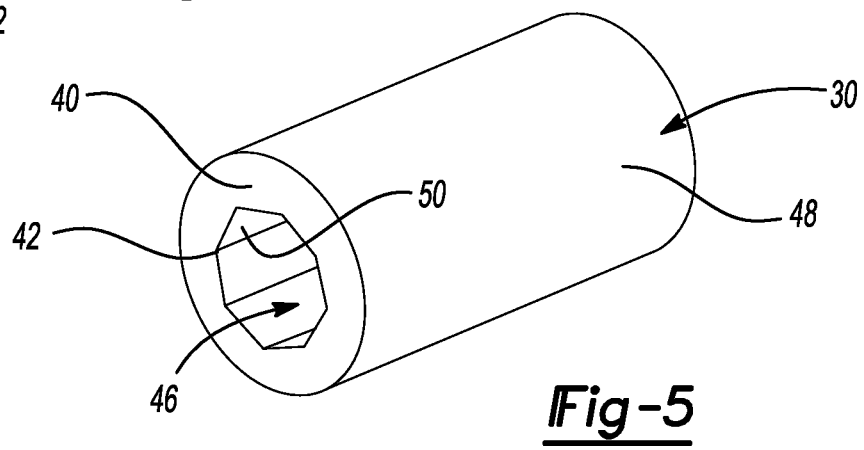
FIG. 5 is a perspective view of a portion of the rotor of FIG. 3, illustrating a magnet in more detail.
Figure 6:
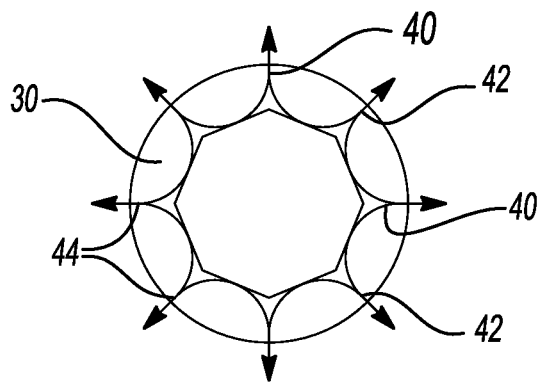
FIG. 6 is a schematic illustration of the magnet depicting magnetic flux lines extending between north and south poles on the magnet.
Figure 7:
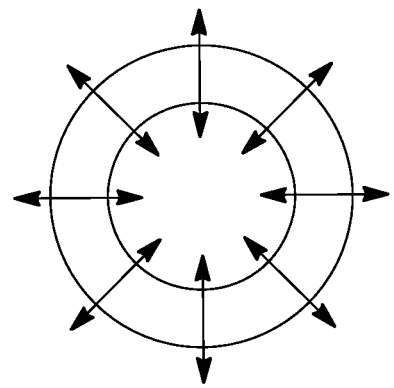
FIG. 7 is a schematic illustration of a magnet of a conventional brushless DC electric motor that depicts flux lines extending into the interior of a rotor.

In FIG. 5, the magnet 30 can be a hollow cylindrical structure that can be formed, for example, of extruded ferrite. The magnet 30 can have a multi-pole oriented configuration that has a plurality of north and south poles 40 and 42, respectively, that alternate around the circumference of the magnet 30. As shown in FIG. 6, magnetic flux lines 44 can connect the north and south poles 40 and 42 and as such, the interior of the magnet 30 need not be filled with a magnetically susceptible material, which is required in a conventional brushless DC electric motor. In this regard, because magnets having a radial anisotropic configuration (illustrated in FIG. 7) are employed in a conventional brushless DC electric motor, a magnetically susceptible material is needed inside the magnet to complete the magnetic circuit. As compared to a conventional brushless DC electric motor, the multi-pole oriented configuration of the magnet 30 eliminates the need for the rotor 16 (FIG. 4) to have a magnetically susceptible core, which permits the center of the rotor 16 (FIG. 4) to be hollow and thereby reduces the rotor's 16 (FIG. 4) mass and moment of inertia. Returning to FIG. 5, the magnet 30 can define a central aperture 46 and an outer magnet surface 48. The central aperture 46 can have a non-circular cross-sectional shape, such as an octagonal shape. It will be appreciated that the selection of the non-circular cross-sectional shape can dictate the quantity of north and south poles 40 and 42. In the particular example provided, the eight interior corners produced by the octagonal shape dictate that the magnet 30 have eight poles, four of which being north poles 40 and four of which being south poles 42. The outer magnet surface 48 can be formed in a desired process, such as centerless grinding.

In FIGS. 2 and 4, the rotor shell 32 can be mounted to the magnet 30 and can be formed of an electrically insulating material, such as a suitable plastic material. In the particular example provided, the rotor shell 32 is overmolded onto (i.e., cohesively bonded to) the magnet 30 so as to encase the outer magnet surface 48 and the interior surface 50 of the magnet 30 in the plastic of the rotor shell 32. The overmolding of material onto the outer magnet surface 48 and the interior surface 50 of the magnet 30 helps to balance the forces that are applied to the magnet 30 when the over mold is formed so that the magnet 30 is not deformed in response to exposure to elevated plastic injection pressures. Additionally, the deposit of overmolded plastic onto the interior surface 50 of the magnet 30 can aid in rotationally balancing the rotor 16. In this regard, if the central aperture 46 in the magnet 30 is slightly off center, the central aperture 46 can be partially filled by the plastic material that forms the overmold in an area where additional mass is needed to rotationally balance the magnet 30. Assuming that the central aperture 46 (FIG. 5) in the magnet 30 is not perfectly centered to the outer magnet surface 48, it will be appreciated that a relatively heavy (i.e., dense) material could be employed to form the rotor shell 32 and that relatively heavier materials (i.e., materials having a density that is similar to the density of the magnet 30) would help to rotationally balance the rotor 16. Optionally, the output coupling 34 and/or the bearing 36 can also be secured to the magnet 30 via the plastic that forms the rotor shell 32 (e.g., the rotor shell 32 can also be overmolded onto the output coupling 34 and/or the bearing 36).

Figure 8:
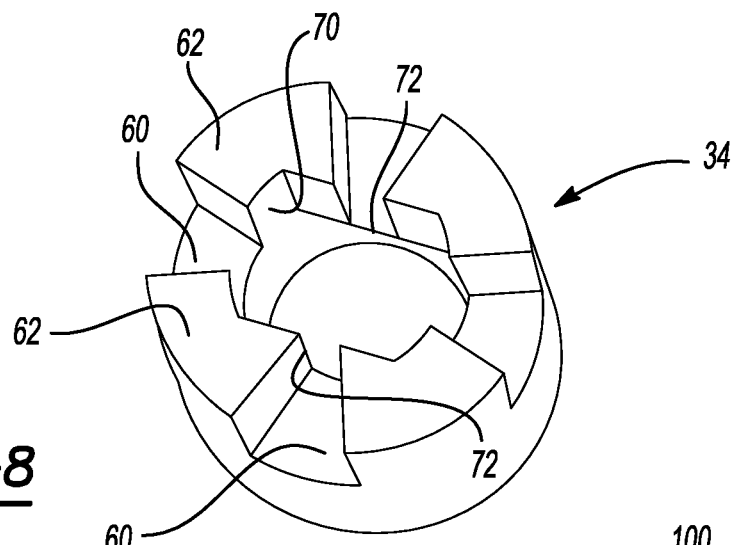
FIG. 8 is a perspective view of a portion of the rotor of FIG. 3 illustrating an output coupling in more detail.

With reference to FIGS. 4 and 8, the output coupling 34 is optional and can be employed, for example, in a situation where it may not be desirable to output rotary power from the motor 10 (FIG. 2) exclusively through the rotor shell 32. In the example provided, the output coupling 34 is formed of a powdered metal material that has been compacted and sintered, and the rotor shell 32 is overmolded to the output coupling 34 to thereby fixedly couple the output coupling 34 to the magnet 30. Alternatively, the rotor shell 32 could be bored or broached and the output coupling 34 could be secured to the rotor shell 32 in a desired manner, such as an interference fit, an adhesive material, staking, deformation of the output coupling 34, rivets and/or threaded fasteners. To facilitate the coupling of the rotor shell 32 to the output coupling 34, the output coupling 34 could employ various features that permit the output coupling 34 to interlock with the rotor shell 32. For example, a plurality of grooves 60 could be formed into the output coupling 34 to define a plurality of castellations 62. The grooves 60 can be configured to receive the material that forms the rotor shell 32. The overmold material that solidifies in the grooves 60 defines a plurality of lock structures (not specifically shown) that cooperate with the castellations 62 to inhibit rotation of the output coupling 34 relative to the rotor shell 32.

The output coupling 34 could be configured with an output member 70 that is configured to transmit rotary power. The output member 70 could be configured as a shaft-like structure, but in the particular example, comprises a non-circular aperture. In the example provided, the non-circular aperture defines two flat surfaces 72 that are disposed in planes that are perpendicular to a rotational axis 74 of the rotor 16. Construction in this manner permits the output coupling 34 to be connected in a slip-fit manner to another structure to transmit rotary power therebetween, provides a modicum of compliance between the torque transmission faces (i.e., permits some misalignment between the flat surfaces 72 and the mating faces of the structure that receives rotary power from the output coupling 34) and provides a connection that is relatively less sensitive to variances in axial length.

In FIG. 2, the bearing 36 can be coupled to the magnet 30 and can be configured to support the rotor 16 on an axial end of the rotor 16 that is opposite the output coupling 34. The rotor shell 32 can be overmolded to the bearing 36 to secure the bearing 36 to the rotor shell 32. Alternatively, a bore can be cast or machined into the rotor shell 32 and the bearing 36 can be assembled into the bore. The bearing 36 can be configured to receive a stub shaft 80 that is formed on the motor housing 12.

Figure 9:
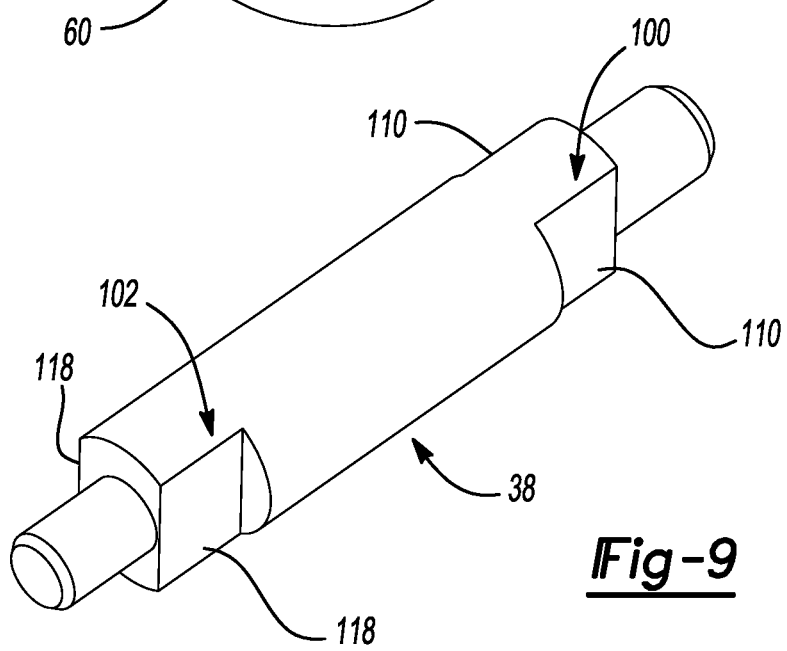
FIG. 9 is a perspective view of a portion of the brushless DC electric motor of FIG. 1, illustrating a shaft member in more detail.

In FIGS. 2, 4 and 9, the shaft member 38 can be a shaft-like structure and can define a first power transmitting portion 100 and a second power transmitting portion 102. The first power transmitting portion 100 is configured to engage the output coupling 34 to receive rotary power therefrom. In the example provided, the first power transmitting portion 100 defines a pair of flat surfaces 110 that are engagable to the flat surfaces 72 (FIG. 8) of the non-circular aperture in the output member 70 (FIG. 8) in the output coupling 34. The second power transmitting portion 102 can be configured to transmit rotary power into a driven device D, such as a transmission or pump. In the example provided, the second power transmitting portion 102 has a pair of flat surfaces 118 and the driven device D has an input member 120 that defines an aperture 122 having a pair of flat surfaces (not specifically shown). The aperture 122 can receive the second power transmitting portion 102 such that the flat surfaces 118 on the second power transmitting portion 102 drivingly engage the flat surfaces on the input member 122.

From the foregoing, it will be appreciated that the motor 10 does not include a bearing on a side of the rotor 16 that is opposite the bearing 36. Rather, the motor 10 can rely on the construction of the driven device D to support the rotor 16 on a side that is opposite the bearing 36. For example, the driven device D could include a bearing or bushing 150 that can support/locate the shaft member 38. Alternatively, the input member 122 of the driven device D may sufficiently support/locate the shaft member 38.

As compared to a conventional brushless DC electric motor, construction of the motor 10 in this manner is relatively inexpensive, permits the axial length of the rotor to be shortened, reduces the moment of inertia of the rotor, reduces runout of the rotor, and eliminates a bearing that supports the rotor for rotation. Moreover, the lower mass and moment of inertia for the rotor 16 permits the rotor 16 to achieve faster acceleration and deceleration.

Figure 11:
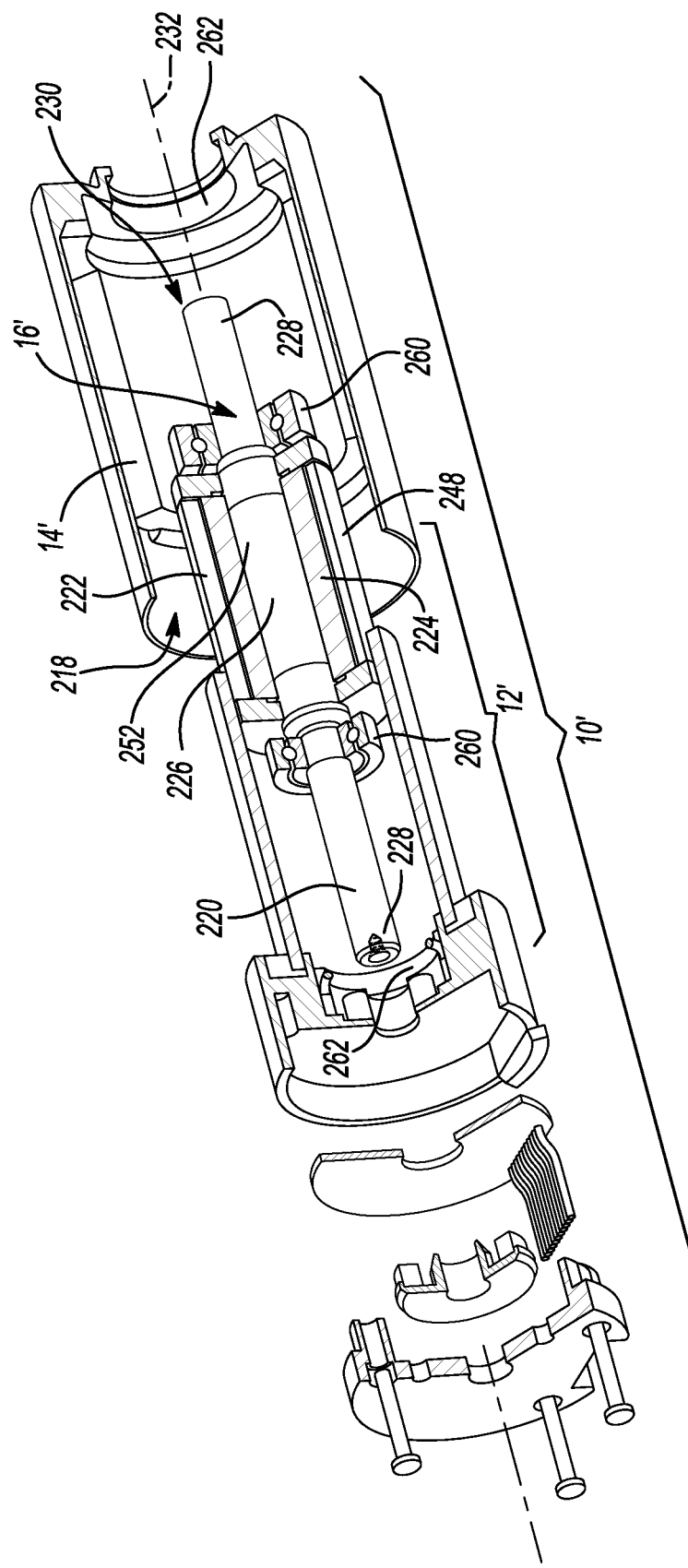
FIG. 11 is an exploded longitudinal section view of the brushless DC electric motor of FIG. 10.

With reference to FIGS. 10 and 11 of the drawings, another brushless DC electric motor 10' can include a motor housing 12', a stator 14' and a rotor 16' that is constructed in accordance with the teachings of the present disclosure. The motor housing 12' can define a cavity 218 into which the stator 14' and the rotor 16' can be received. The stator 14' can conventionally include a plurality of windings. The stator 14' can be constructed in a conventional manner and need not be discussed in detail herein.

Figure 12:
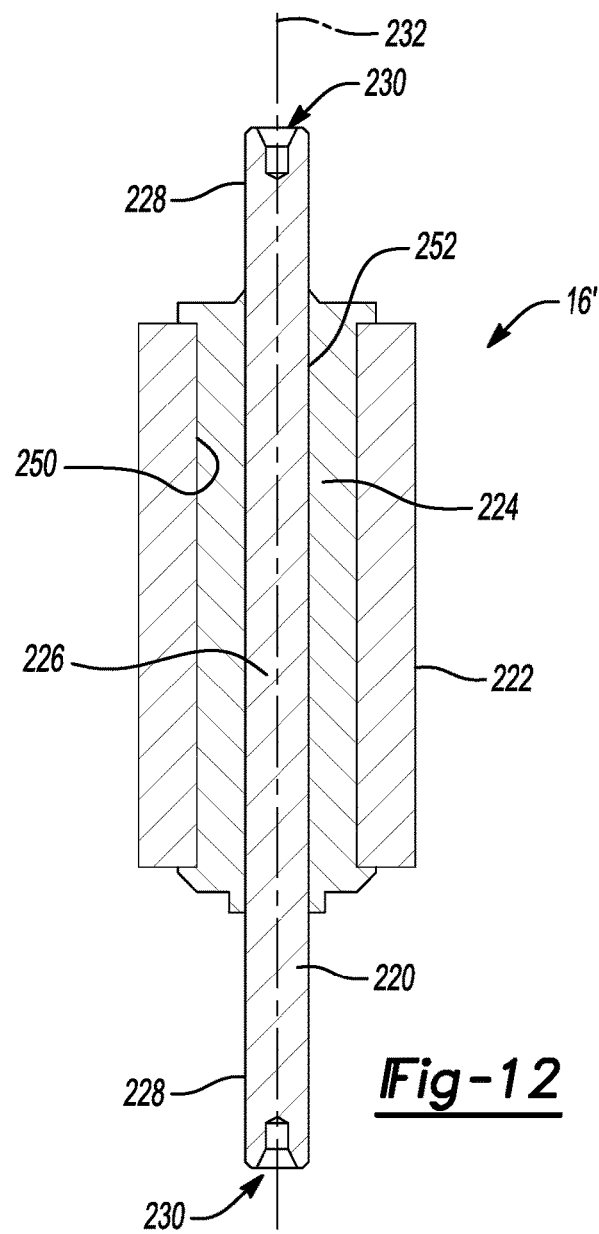
FIG. 12 is a longitudinal section view of a portion of the brushless DC electric motor of FIG. 10, illustrating a rotor in more detail.
Figure 13:
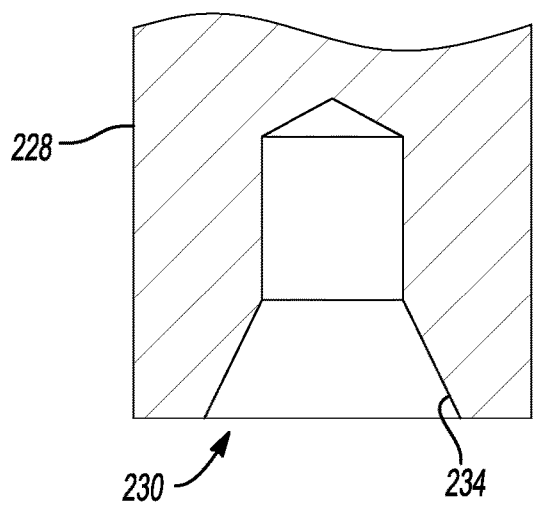
FIG. 13 is an enlarged portion of FIG. 12 illustrating a centering feature formed in an end section of a motor output member of the rotor.

In FIGS. 11 and 12, the rotor 16' can comprise a rotor output member 220, a magnet 222 and a coupling member 224. The rotor output member 220 can be a shaft-like structure having a body portion 226 and a pair of end sections 228 that are disposed on opposite axial ends of the body portion 226. Each of the end sections 228 can include a centering feature 230; the centering features 230 are configured for use in aligning a rotational axis 232 of the rotor output member 220 in a predetermined manner. In the example provided, each of the centering features 230 comprises a frusto-conical surface 234 (FIG. 13) that can be formed, for example, with a centerdrill (not shown). It will be appreciated, however, that one or both of the centering features 230 could be formed in a different manner and can comprise one or more exterior surfaces on the motor output member 220.

With reference to FIGS. 11, 14 and 15, the magnet 22 can be a hollow cylindrical structure that can be formed, for example, of extruded ferrite. The magnet 222 can have a multi-pole oriented configuration that has a plurality of north and south poles 240 and 242, respectively, that alternate around the circumference of the magnet 222. As shown in FIG. 15, magnetic flux lines 244 can connect the north and south poles 240 and 242 and as such, the interior of the magnet 222 need not be filled with a magnetically susceptible material, which is required in a conventional brushless DC electric motor. In this regard, because magnets having a radial anisotropic configuration are employed in a conventional brushless DC electric motor, a magnetically susceptible material is needed inside the magnet to complete the magnetic circuit. As compared to a conventional brushless DC electric motor, the multi-pole oriented configuration of the magnet 222 eliminates the need for the rotor 16' to have a magnetically susceptible solid core.

In FIGS. 11 and 14, the magnet 222 can define a central aperture 246 and an outer magnet surface 248. The central aperture 246 can have a non-circular cross-sectional shape, such as an octagonal shape, into which the rotor output member 220 can be received. It will be appreciated that the selection of the non-circular cross-sectional shape can dictate the quantity of north and south poles 240 and 242. In the particular example provided, the eight interior corners produced by the octagonal shape dictate that the magnet 222 have eight poles, four of which being north poles 240 and four of which being south poles 242. It will be appreciated that the central aperture 246 could be shaped in a cross-section perpendicular to the rotational axis 232 as a polygon, such as a polygon having between five and ten sides. The outer magnet surface 248 can be formed in a desired process, such as a centerless grinding operation. The rotor output member 220 can be aligned to the magnet 222 such that the outer magnet surface 248 is concentrically disposed about the rotational axis 232 of the rotor output member 220.

The coupling member 224 can be mounted to the magnet 222 and can be formed of an electrically insulating material, such as a suitable plastic. In the particular example provided, the coupling member 224 is overmolded (i.e., cohesively bonded) to both an interior magnet surface 250, which is defined by the central aperture 246, and an exterior surface 252 of the body portion 226 of the rotor output member 220 to thereby fixedly couple the magnet 222 and the rotor output member 220 together. The deposit of overmolded plastic into the central aperture 246 can aid in rotationally balancing the rotor 16'. In this regard, if the central aperture 246 in the magnet 222 is slightly off center (relative to the outer surface 248 of the magnet 222 and/or the rotational axis 232 of the rotor 16'), the plastic material in the central aperture 246 provides additional mass at a location that helps to rotationally balance the magnet 222. Assuming that the central aperture 246 (FIG. 5) in the magnet 222 is not perfectly centered to the outer magnet surface 248, it will be appreciated that a relatively heavy (i.e., dense) material could be employed to form the coupling member 224 and that relatively heavier materials (i.e., materials having a density that is similar to the density of the magnet 222) would help to rotationally balance the rotor 16'. In this regard, the plastic material that forms the coupling member 224 could have a density that is within ten or five percent of the density of the material that forms the magnet 222 at a predetermined temperature, such as 70 degrees Fahrenheit. Suitable plastic materials include polypropylene, nylon 6, polybutylene terephthalate or any other high specific gravity thermoplastic compound.

The rotor 16' can be rotatably received in the stator 14'. One or more bearings can be employed to support the rotor 16' for rotation relative to the motor housing 12'. In the particular example provided, a bearing 260 is mounted to between each of the end sections 228 and an associated bearing mount 262 formed by the motor housing 12.

Figure 19:
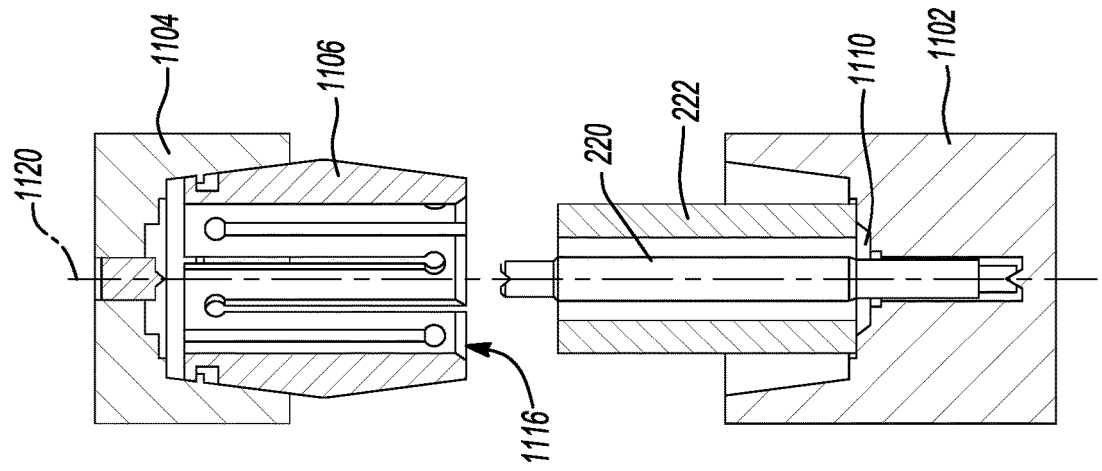

With reference to FIG. 19, an injection mold 1000 for forming the rotor 16' (FIG. 2) is illustrated. The injection mold 1000 can have first and second mold members 1102 and 1104, respectively, and a collet 1106. The first and second mold members 1102 and 1104 can be movable between closed position (shown in FIG. 21) that can partly define a mold cavity 1110, and an open position (shown in FIG. 17) that permits components to be received into or removed from the mold cavity 1110. Each of the first and second mold members 1102 and 1104 can define a portion of the mold cavity 1110. The collet 1106 can be a sleeve-like structure having a plurality of collet fingers 1114 that are disposed in a circumferentially spaced apart manner. The collet 1106 can define a collet aperture 1116 that is sized to receive the magnet 222 (FIG. 5). The collet 1106 can be received between the first and second mold members 1102 and 1104 and can be mounted to the second mold member 1104 in a predetermined position to thereby align the outer magnet surface 248 (FIG. 5) of the magnet 222 (FIG. 5) in a manner that is concentric with a mold axis 1120 that is defined by the mold cavity 1110. In the example provided, the collet 1106 is mounted to the second mold member 1104 in a manner that permits limited movement of the collet 1106 relative to the second mold member 1102. For example, the collet 1106 can define an elongated groove 117 into which a relatively narrower annular shoulder 1118 can be received. The annular shoulder 1118 can be a discrete component, such as a snap ring, that can be assembled to the second mold member 1102 or can be integrally and unitarily formed with the second mold member 1102.

Figure 18:
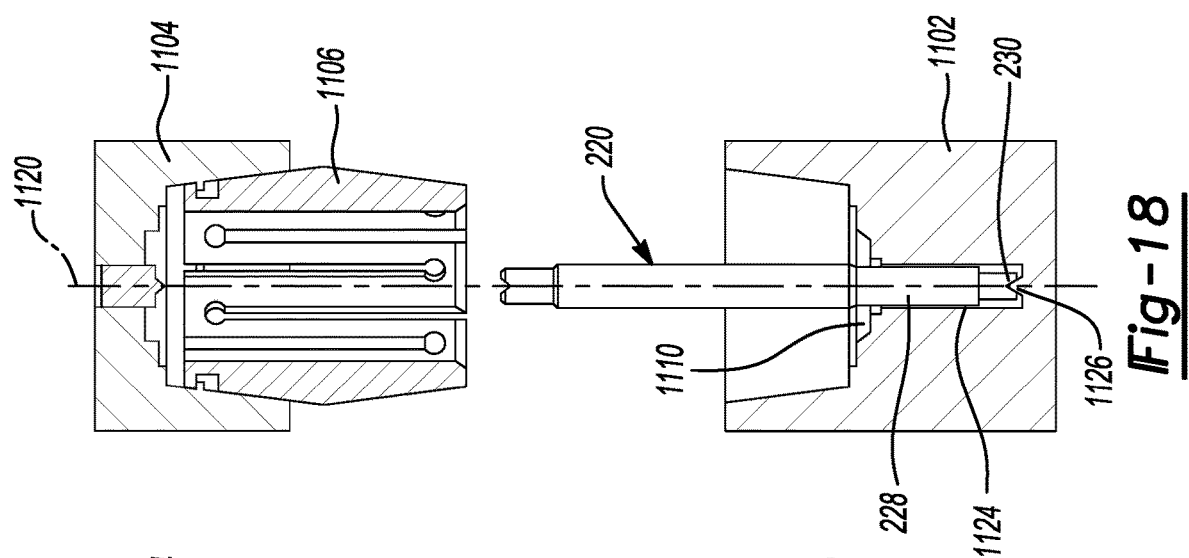
Figure 17:
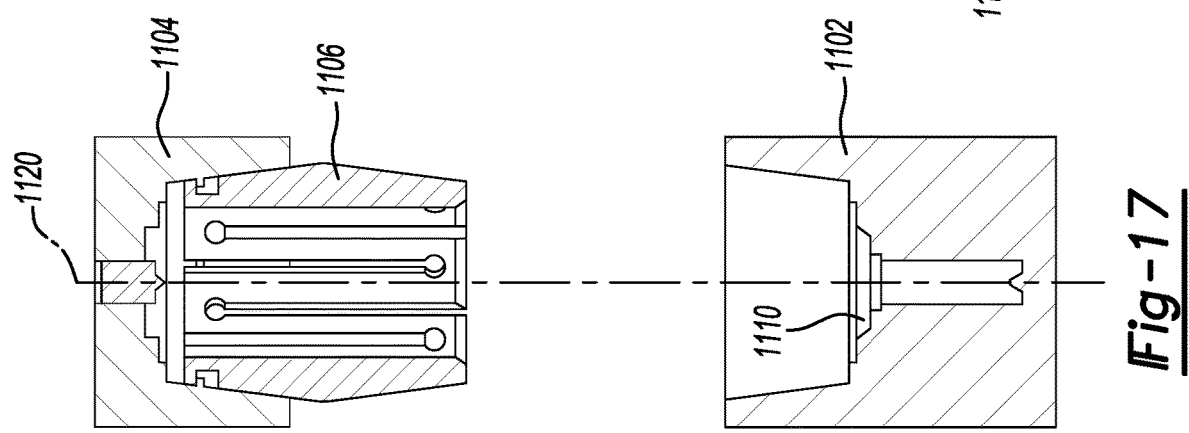

In FIG. 18, the motor output member 220 can be loaded into one of the portions of the mold cavity 1110 that can be defined by either the first mold member 1102 or the second mold member 1104. For purposes of clarity, the discussion will refer to the motor output member 220 as being loaded into the portion of the mold cavity 1110 that is defined by the first mold member 1102, but those of skill in the art will appreciate that the motor output member 220 could alternatively have been loaded into the portion of the mold cavity 1110 that is defined by the second mold member 1104. In the particular example provided, the first mold member 1102 defines a first shaft cavity 1124, which is disposed concentrically about the mold axis 1120 and configured to receive an end section 228 of the motor output member 220. The first mold member 1102 can include a first centering member 1126 that is disposed in the first shaft cavity 1124 and configured to engage a corresponding one of the centering features 230 formed on the axial end of the motor output member 220 when the motor output member 220 is received into the first shaft cavity 1124.

In FIG. 19, the magnet 222 can be inserted into the portion of the mold cavity 1110 that is defined by the first mold member 1102 such that the rotor output member 220 is received through the magnet 222. Alternatively, the magnet 222 could be loaded directly into the collet 1106.

Figure 21:
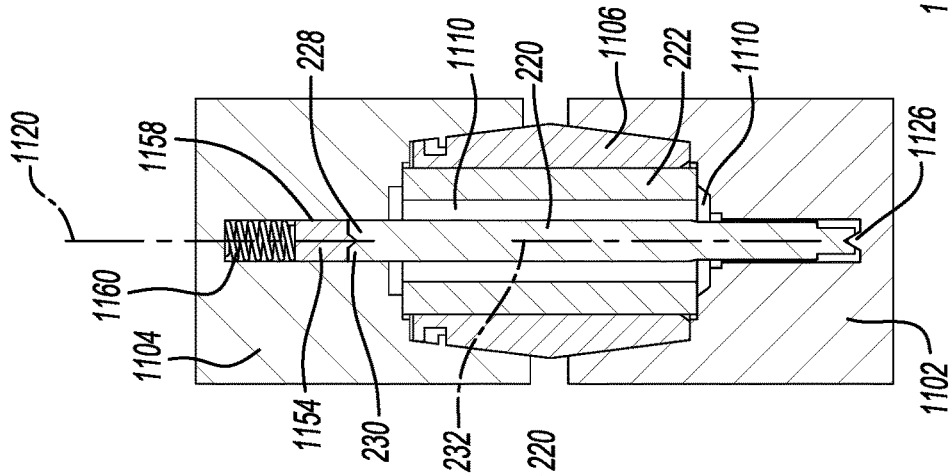
Figure 20:
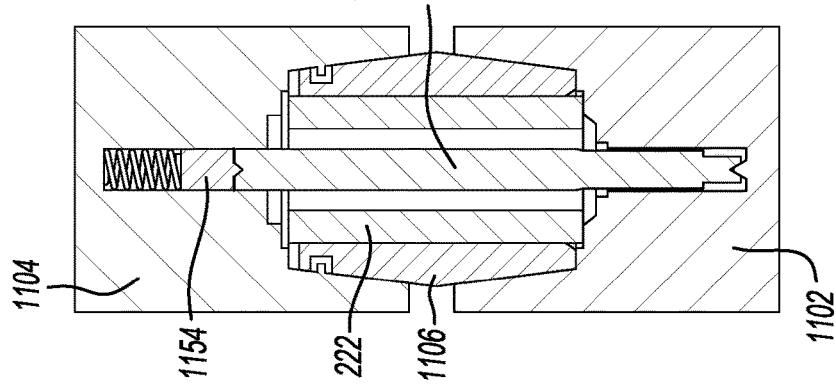

In FIG. 20, the first and second mold members 1102 and 1104 can be moved relative to one another such that the magnet 222 is received into the collet aperture 1116 (FIG. 19) and to position the first and second mold members 1102 and 1104 in the closed position as shown in FIG. 21. Placement of the first and second mold members 1102 and 1104 in the closed position causes engagement of the collet fingers 114 (FIG. 16) to the outer magnet surface 248 (FIG. 5) of the magnet 222 with a predetermined load as well as alignment of both the magnet 222 and the motor output member 220 to the mold axis 1120.

Returning to FIG. 16, the first and second mold members 1102 and 1104 can have collet engaging features 1150 that can cause the collet 1106 to contract in a radial direction and clamp the collet fingers 1114 against the outer magnet surface 248 (FIG. 14) of the magnet 222 (FIG. 14). In the example provided, the opposite axial ends of the collet 1106 are fusto-conically shaped so that each of the frusto-conical shapes diverges with decreasing distance to the opposite axial end of the collet 1106 and the collet engaging features 1150 have a corresponding frusto-conical shape. Configuration in this manner aids in centering the collet 1106 relative to the mold axis 1120 and permits the application of a radially inwardly directed force to the collet 1106 when the first and second mold members 1102 and 1104 are moved in an axial direction toward one another.

With reference to FIGS. 16 and 21, positioning of the first and second mold members 1102 and 1104 in the closed position can also engage a second centering member 1154, which is mounted to the second mold member 1104, to one of the centering features 230 that is received into the portion of the mold cavity 1110 that is defined by the second mold member 1104. The first and second centering members 1126 and 1154 can cooperate to align the rotational axis 232 of the rotor output member 220 to the mold axis 1120 (i.e., such that the rotational axis 232 of the rotor output member 220 and the mold axis 1120 are coincident). In the particular example provided, the second centering member 1154 can be slidably received in a second shaft cavity 1158 formed in the second mold member 1104 and a spring 1160 can be employed to bias the second centering member 1154 in a direction toward the first mold member 1102. Configuration in this manner permits the second centering member 1154 to consistently engage the centering feature 230 on the associated axial end 228 of the rotor output member 220 despite variances in the overall length of the rotor output member 220.

Figure 22:
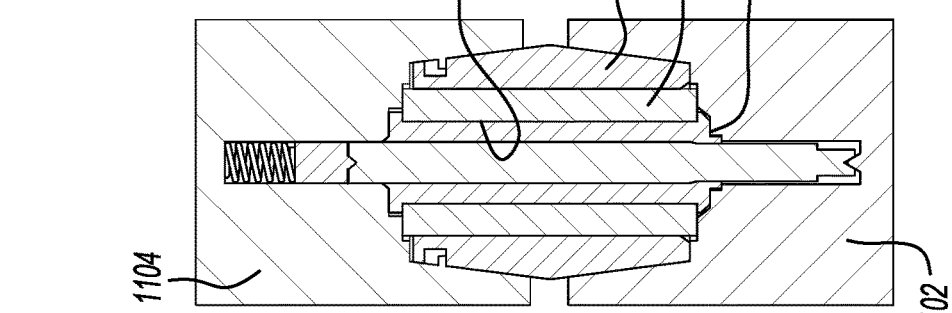

In FIG. 22, molten plastic can be injected into the mold cavity 1110 through the first mold member 1102 or the second mold member 1104. It will be appreciated that the pressure at which the molten plastic is injected into the mold cavity 1110 can be relatively high (e.g., greater than or equal to 1000 psig, or greater than or equal to 2000 psig, or greater than or equal to 3000 psig) and can create a radially outwardly directed force that is applied to the interior magnet surface 250 of the magnet 222. Ordinarily, the magnitude of the radially outwardly directed force can be sufficiently large to cause the magnet 222 to fracture. The radially inwardly directed force that is applied to the magnet 222 by the collet 1106, however, can counteract the radially outwardly directed force that is generated by the injection of the plastic material into the central aperture 246 (FIG. 14) of the magnet 222.

Figure 23:
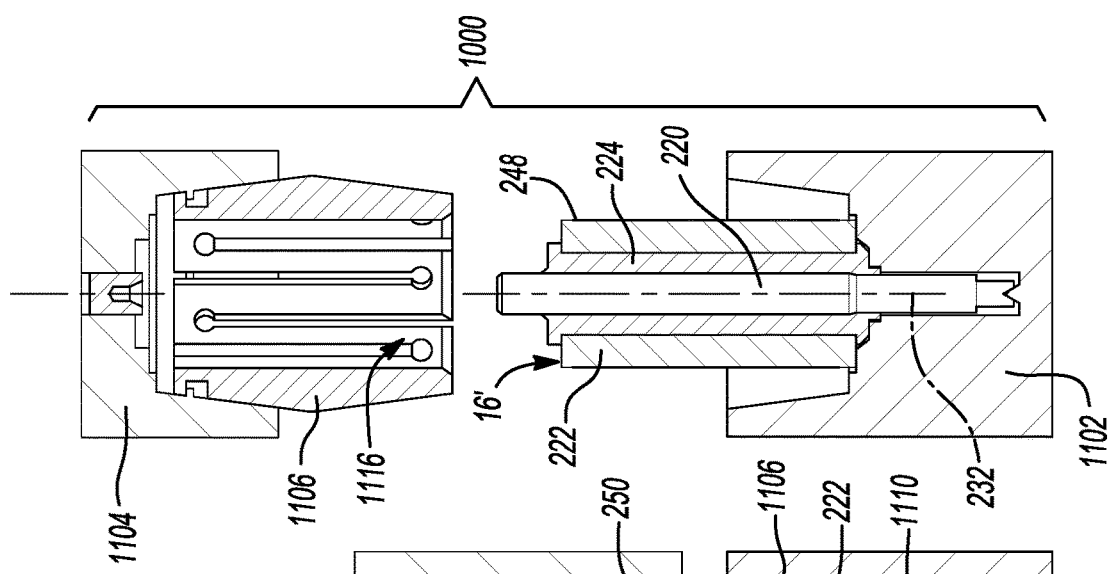

In FIG. 23, the molten plastic can be cooled to form a solid overmold member, i.e., the coupling member 224, and to secure the magnet 222 to the rotor output member 220). Thereafter, the first and second mold members 1102 and 1104 can be positioned in the open position to permit the rotor 16' to be removed from the injection mold 1000. If necessary, the rotor 16' can be processed in a balancing operation to rotationally balance the rotor 16' about the rotational axis 232.

While the motor output member 220 has been described as being separately formed from the coupling member 224 such that the two elements are discrete components, it will be appreciated that the output member 220 could be co-formed with the coupling member 224 (i.e., the output member 220 and the coupling member 224 could be formed simultaneously, e.g., injection molded from a plastic material). Those of skill in the art will further appreciate that the magnet 222 may be secured in the collet 1106 in ways other than by closing the first and second mold members 1102 and 1104. For example, the collet 1106 could be threaded into the second mold member 1104 such that surfaces on the second mold member 1104 and the collet 1106 cooperate to contract the fingers 1114 (FIG. 16) on the collet 1106 against the outer surface 248 of the magnet 222 when the collet 1106 is threaded into the second mold member 1104.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a brushless DC electric motor comprising:
   providing a hollow magnet having a multi-pole configuration;
   inserting the hollow magnet into a collet;
   inserting an output member into a cavity in a mold;
   orienting the output member concentric with an outer surface of the hollow magnet;
   closing the mold;
   overmolding a plastic material onto an interior surface of the hollow magnet and thereby coupling the output member to the hollow magnet; and
   inserting a rotor into a stator, the rotor comprising the hollow magnet, the output member and the plastic material that is overmolded onto the interior surface of the hollow magnet.

2. The method of claim 1, wherein in a cross-section taken perpendicular to an axis about which the rotor is rotatable relative to the stator, an interior cavity defined by the interior surface of the hollow magnet has a non-circular cross-sectional shape.

3. The method of claim 2, wherein the non-circular cross-sectional shape is a polygon.

4. The method of claim 3, wherein the polygon has between five and ten sides.

5. The method of claim 1, wherein the hollow magnet has a center of mass, and wherein the center of mass is offset from an axis about which the rotor rotates relative to the stator.

6. The method of claim 5, further comprising machining an outside surface of the hollow magnet prior to overmolding the plastic material onto the interior surface of the hollow magnet.

7. The method of claim 6, wherein the outside surface of the hollow magnet is ground in a centerless grinding operation.

8. The method of claim 6, further comprising machining at least one of the hollow magnet and the overmolded plastic material after the plastic material has been overmolded onto the hollow magnet.

9. The method of claim 5, wherein the plastic material that is overmolded onto the interior surface of the hollow magnet has a density that is within +/−10% of a density of the material that forms the hollow magnet when the rotor is at a temperature of 70 degrees Fahrenheit.

10. The method of claim 9, wherein the density of the plastic material is within +/−5% of a density of the material that forms the hollow magnet.

11. The method of claim 1, wherein the hollow magnet is formed of a powdered metal material.

12. The method of claim 1, wherein the output member is a sleeve that is received in one end of the rotor such that the plastic material is disposed radially between the sleeve and the interior surface of the hollow magnet.

13. The method of claim 12, wherein the sleeve defines a plurality of projections that are embedded into the plastic material.

14. The method of claim 13, wherein the projections are castellations.

15. The method of claim 1, wherein the output member is disposed in a first end of the rotor and a bearing is disposed in an opposite end of the rotor such that the plastic material is disposed radially between the bearing and the interior surface of the hollow magnet.

16. The method of claim 15, wherein the stator includes a motor case, and wherein the motor case includes a hub onto which the bearing is received, the bearing supporting the rotor for rotation on the hub.

17. The method of claim 1, wherein the collet is secured to a portion of the mold for movement therewith.

18. The method of claim 1, wherein the output member comprises a shaft.

19. A method for forming a rotor, the method comprising:
    providing an injection mold having a collet and first and second mold members, the collet being received between the first and second mold members, each of the first and second mold members defining a portion of a mold cavity;
    installing a motor output member into one of the portions of the mold cavity;
    installing a hollow cylindrical magnet into the collet;
    positioning the first and second mold members in a closed position to locate an outer surface of the hollow cylindrical magnet relative to a rotational axis of the motor output member and to apply a compressive force onto the outer surface of the hollow cylindrical magnet;
    injecting molten plastic under pressure between hollow cylindrical magnet and the motor output member; and
    cooling the injected molten plastic to secure the motor output member to the hollow cylindrical magnet.

20. The method of claim 19, wherein the hollow cylindrical magnet defines a non-round central aperture.

21. The method of claim 19, wherein prior to installing the hollow cylindrical magnet into the collet, the method comprises grinding the outer surface of the hollow cylindrical magnet.

22. The method of claim 21, wherein the outer surface of the hollow cylindrical magnet is ground in a centerless grinding operation.

23. The method of claim 19, wherein positioning the first and second mold members in the closed position engages a pair of centering members to the motor output member, the centering members being configured to align the rotational axis of the motor output member coincident with a rotor axis that is defined by the first and second mold members.

24. The method of claim 23, wherein one of the centering members is movable along the rotor axis.

25. The method of claim 23, wherein each of the first and second mold members has a frusto-conically shaped collet-engaging surface that is configured to engage an associated one of a pair of frusto-conically shaped mold-engaging surfaces defined by the collet.

26. The method of claim 25, wherein the collet is mounted to one of the first and second mold members for movement therewith.

27. The method of claim 26, wherein the collet is mounted to the one of the first and second mold members in a manner that permits limited movement of the collet relative to the one of the first and second mold members.

28. The method of claim 19, wherein cooling the injected molten plastic forms a solid overmold member and wherein at a temperature of 70 degrees F., the solid overmold member has a density that is within 10% of a density of the hollow cylindrical magnet.

29. The method of claim 28, wherein the density of the solid overmold member is within 5% of the density of the hollow cylindrical magnet.

30. A method for forming a rotor, the method comprising:
providing an injection mold having first and second mold members, each of the first and second mold members defining a portion of a mold cavity;
installing a motor output member into one of the portions of the mold cavity;
coupling a hollow cylindrical magnet to one of the first and second mold members;
positioning the first and second mold members in a closed position to align a longitudinal axis of the motor output member coincidently with a rotational axis of a rotor that is defined by the first and second mold members, to locate the outer surface of the hollow cylindrical magnet concentrically about the rotor axis and to apply a compressive force to the outer surface of the hollow cylindrical magnet;
injecting molten plastic under pressure between hollow cylindrical magnet and the motor output member; and
cooling the injected molten plastic to secure the motor output member to the hollow cylindrical magnet
wherein cooling the injected molten plastic forms a solid overmold member and wherein at a temperature of 70 degrees F., the solid overmold member has a density that is within 10% of a density of the hollow cylindrical magnet.

31. The method of claim 30, wherein a pressure of the molten plastic that is injected between the hollow cylindrical magnet and the motor output member is greater than or equal to 1000 p.s.i.g.

32. The method of claim 31, wherein the pressure is greater than or equal to 2000 p.s.i.g.

33. The method of claim 32, wherein the pressure is greater than or equal to 3000 p.s.i.g.

34. The method of claim 30, wherein prior to coupling the hollow cylindrical magnet to the one of the first and second mold members, the method comprises grinding the outer surface of the hollow cylindrical magnet.

35. The method of claim 34, wherein the outer surface of the hollow cylindrical magnet is ground in a centerless grinding operation.

36. The method of claim 30, wherein the density of the solid overmold member is within 5% of the density of the hollow cylindrical magnet.

37. The method of claim 30, wherein positioning the first and second mold members in the closed position engages a pair of centering members to the motor output member, the centering members being configured to align the rotational axis of the motor output member coincident with a rotor axis that is defined by the first and second mold members.

38. The method of claim 37, wherein one of the centering members is movable along the rotor axis.

* * * * *